Feb. 13, 1940.  J. G. VINCENT  2,190,224
MOTOR VEHICLE
Filed Dec. 7, 1936  3 Sheets-Sheet 2
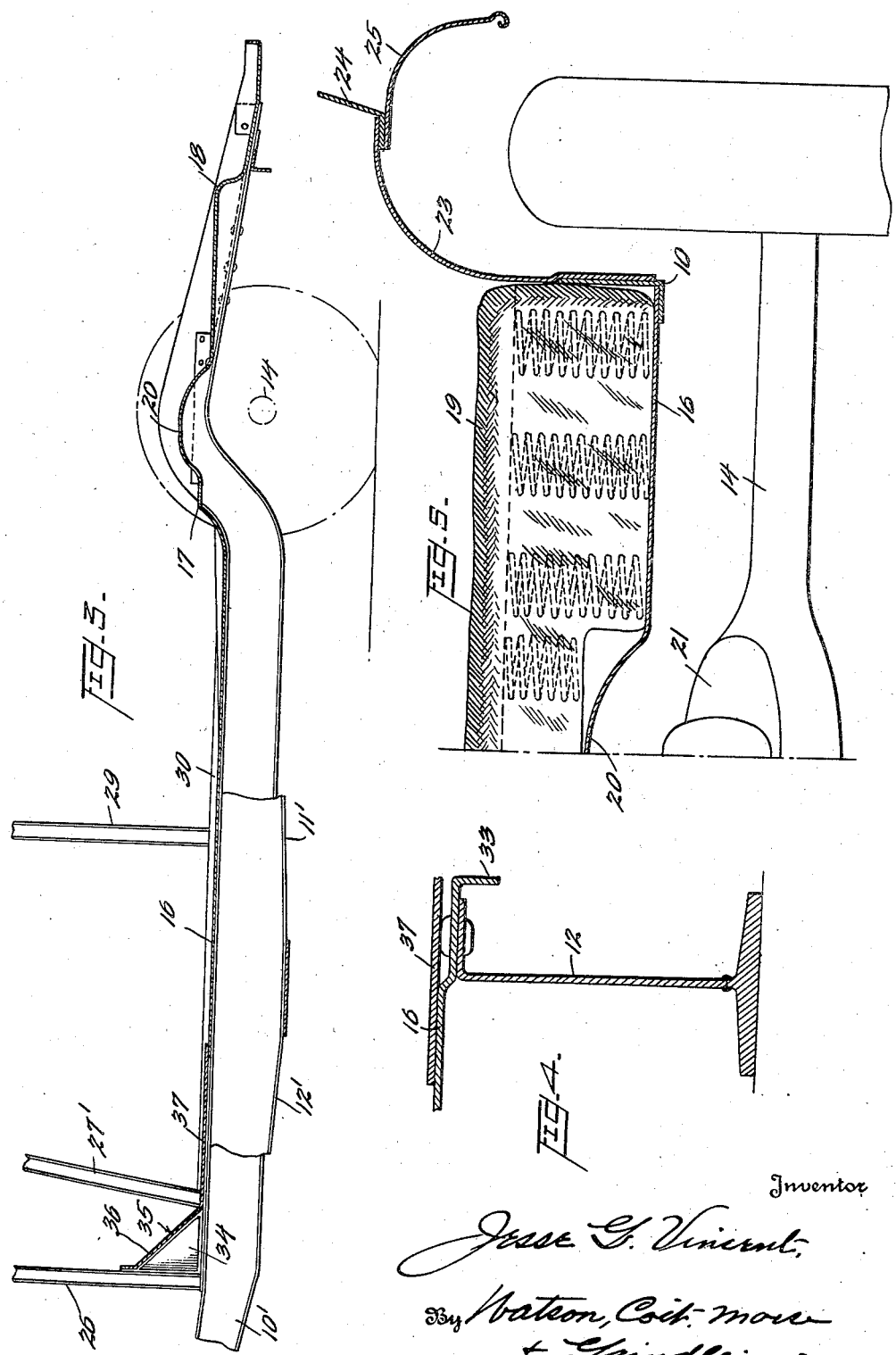

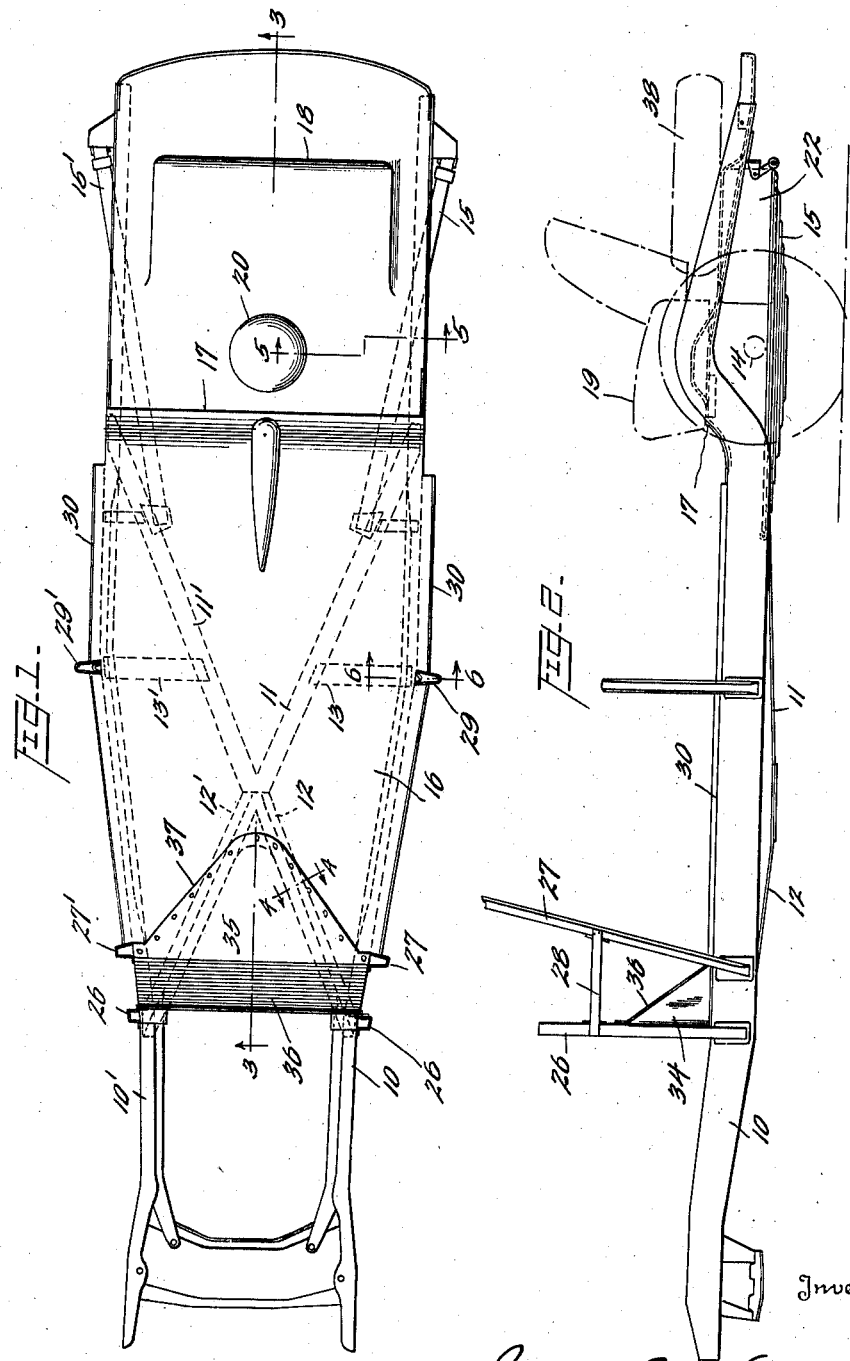

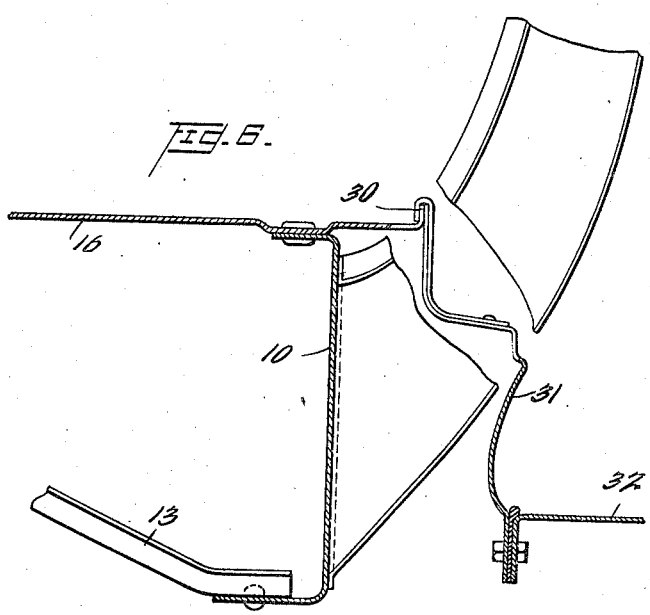
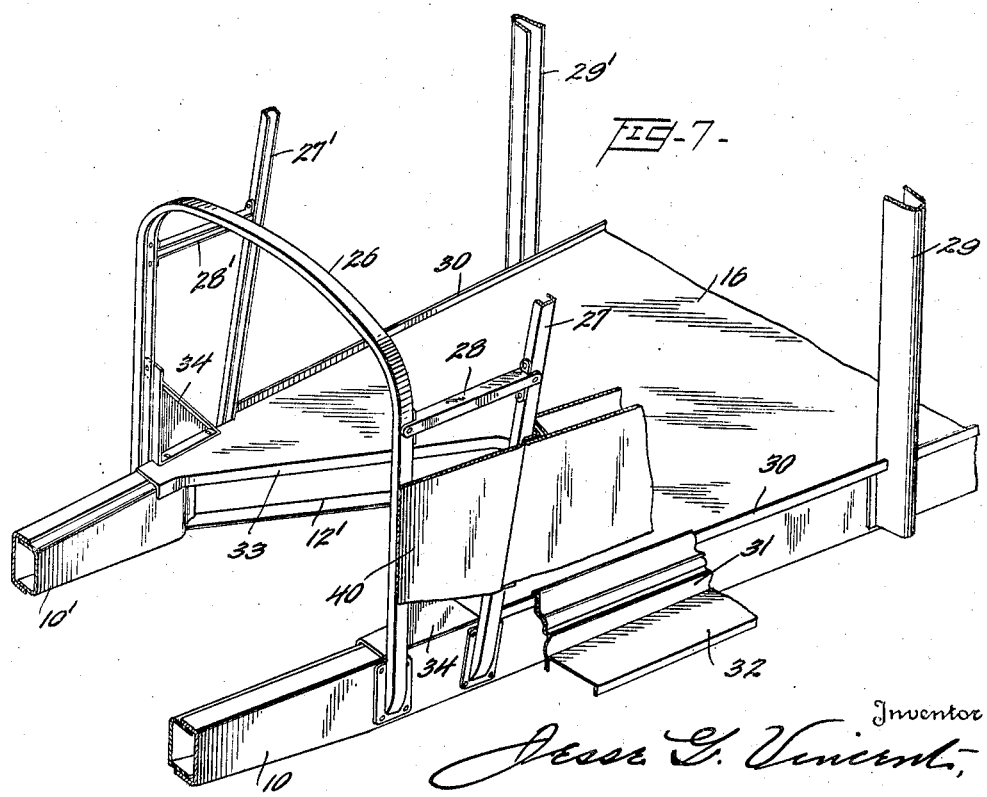

Patented Feb. 13, 1940

2,190,224

UNITED STATES PATENT OFFICE 2,190,224

MOTOR VEHICLE

Jesse G. Vincent, Grosse Pointe, Mich., assignor to Packard Motor Car Company, Detroit, Mich., a corporation of Michigan Application December 7, 1936, Serial No. 114,692

8 Claims. (Cl. 280—106)

This invention relates to motor vehicles and particularly to the manner of uniting the body elements of a motor vehicle to the chassis thereof.

The motor vehicle now in common use is composed of two entirely separate units, namely, the body and the chassis. Each of these units is assembled separately, the superpositioning of the body on the chassis being one of the final steps in the manufacture of the vehicle. One disadvantage of the present construction, in which the body is bolted to the chassis, is the fact that the body bolts must be tightened periodically in order to eliminate squeaks and maintain the necessary rigidity in the connection between the units. Another disadvantage is the fact that the body pillars are mounted on the body sills too far from the frame side members to assist materially the rigidity of the structure as a whole.

In the present method of construction, a shortened chassis frame or "body buck" is placed on the body assembly line and the body is then built up on this buck during its passage along the line. When the body has been completed and has reached the end of its assembly line, it is removed from the buck and transported to a point in another assembly line, where it is fitted on to a chassis which has been built up on that assembly line. The maintenance of two assembly lines, as stated, entails the use of a large amount of floor space, and one object of the present invention is to enable the chassis and body to be assembled as one unit rather than two, thus eliminating one assembly line.

In the present type of body construction, there is frequently a tendency for the cowl and windshield to vibrate laterally, due to the fact that the supporting structure for these members is anchored to the body sill at its weakest point. In the construction according to the present invention, the structure for the cowl is anchored to the frame at points where high rigidity is maintained. This feature will contribute much to cowl rigidity, particularly in convertible bodies which have always presented a problem in this respect.

In the present form of construction, the rear seat cushion is of necessity set down between the side members of the chassis frame and, due to the encroachment of the inwardly projecting upper flanges of the side members, the coil springs at the ends of the rear seat cushion must be made shorter than the remaining springs of the cushion. In the proposed construction, as the top flange of the side members terminates in advance of this point, the springs at the ends of the seat cushion may be made full length, thus enhancing the resilience of the cushion and making it more comfortable.

From the standpoint of production, the proposed construction will enable large savings to be made, due to the reduction in the number of parts used and the reduction in floor space required. Also, a car constructed according to the present invention will be lighter in weight, and will possess much more rigidity than the present motor vehicles, thus ensuring greater safety, roadability and riding comfort.

The present invention has for its object the accomplishment of the foregoing advantages. A further object is the provision of a body construction in which the usual body sills are dispensed with, and a unitary floor member is secured directly on the chassis frame. Another object is the provision of a body structure in which the body pillars are secured directly to the side members of the chassis frame, the body panels being secured to the pillars and/or floor member. Another object is the provision of a unitary floor member formed at its rear to provide a seat pan and to provide clearance for a fuel tank disposed therebeneath. Space may also be provided for the storage of tools, etc.

Other and further objects, features and advantages will appear from the description which follows, together with the accompanying drawings, in which:

Figure 1 is a plan view of a chassis frame having a floor and body pillars secured thereto in accordance with the present invention;

Figure 2 is a side elevation of the construction of Figure 1;

Figure 3 is a fragmentary vertical section on line 3—3 of Figure 1;

Figure 4 is a vertical section on line 4—4 of Figure 1;

Figure 5 is a vertical section on line 5—5 of Figure 1;

Figure 6 is a section on line 6—6 of Figure 1; and

Figure 7 is a perspective view of a portion of the structure illustrated in Figures 1 and 2.

In order to facilitate an understanding of the invention, reference is made to the embodiment thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Referring to the drawings, the chassis frame illustrated comprises the usual side members 10 and 10', rigidly connected by cross members 11, 11' and 12, 12' arranged in X form. Bracing members 13 and 13' may be employed to enhance the rigidity of the frame structure. The side members 10, 10' are of channel section (Figure 6), the upper horizontal flange preferably being of less width than the lower flange. The cross members may be of any suitable section, such as the modified T section shown in Figure 4, having a relatively narrow horizontal upper flange.

Side members 10, 10' are curved upwardly adjacent their rear ends in the usual manner, to provide clearance for a rear axle 14 and associated mechanism, on which the frame is supported in the usual manner by leaf springs 15, 15'.

A unitary metallic floor member 16 is secured, by rivets or other suitable means, directly to the chassis frame, being secured to the upper flanges of the cross members 11, 11' and 12, 12' and the upper flanges of the side members 10, 10' rearwardly to a point 17, somewhat in advance of the rear axle 14. At the point 17, which is located on the upward curve of the side members, and at the desired level of the seat pan for the rear seat cushion, the upper flanges of the side members terminate, the side members being of L section from point 17 rearwardly.

As illustrated in Figure 3, the floor member 16 is deformed to follow the curve of the side members adjacent point 17 and forwardly thereof. From point 17 rearwardly the floor member 16 extends substantially horizontally to a point 18, the horizontal portion of the floor member providing a pan or support for a seat cushion 19 (Figure 2). As illustrated, the floor member 16 is deformed centrally of the aforesaid seat pan, as at 20, to provide clearance for the usual differential housing 21 associated with rear axle 14. A horizontal portion of the floor member rearwardly of the seat pan provides space therebeneath for a fuel tank 22, the lateral edges of the floor member adjacent the fuel tank, and the rearwardly extending portion of the floor member being curved downwardly to lie in the plane of the lower flange of side members 10 and 10', to which this rearward portion of floor member 16 is secured by rivets or other suitable means.

The side members 10, 10' are strengthened rearwardly of point 17, and the necessary rigidity established by securing wheeled housings 23 directly to the side members, as by welding or other suitable means. A rear body panel 24 is secured to the laterally projecting edges of wheeled housings 23, fenders 25 being secured to the wheel housings and body panel along the same line of juncture.

The supporting structure for the cowl and windshield comprises an inverted U-shaped member 26 and pillars 27, 27', all affixed to the side members 10 and 10' by rivets or other suitable means. Bracing members 28 and 28' connect the pillars 27 with the member 26, enhancing the rigidity of the cowl and windshield supporting structure. Main body pillars 29, 29' are secured directly to the side members 10 and 10' in a similar manner. The upper body panels may be welded or otherwise secured to the pillars and U-member 26 in the usual manner, a portion of one such panel being indicated at 40, Figure 7.

The floor member 16 is provided at its lateral edges with upturned flanges 30, to which aprons 31 are secured as illustrated in Figure 6. Running boards 32 are bolted or otherwise fastened to the lower edges of aprons 31.

The forward edge of the floor member 16 is of V-shape, corresponding to the forward end of the X frame comprised by cross members 12, 12' to which it is secured, and may be formed with a depending flange 33 (Figure 7). Triangle brackets 34, secured between the floor member 16 and U-member 26 enhance the rigidity of the latter member, and provide an inclined abutment for a toe board 35. The latter is formed with an inclined portion 36, which rests on the brackets 34, and a triangular horizontal portion 37 which overlies the V-shaped opening in the forward end of floor member 16, thus completing the floor of the forward compartment of the vehicle. The toe board 35 may be secured to the floor member 16 and brackets 34 in any suitable manner, as by screws, and may be divided, longitudinally of the vehicle, into two complementary members if desired.

It is contemplated that the chassis structure forward of the U-member 26 will be constructed in the usual manner, hence it is unnecessary to include such construction in the present description.

As may be seen in Figure 2, a spare tire 38 may be supported, by suitable means not shown, upon the horizontal portion of the rearward end of the floor member 16, above the fuel tank 22, a storage space for tools, etc., being provided between the underside of the tire 38 and the depressed portion of floor member 16 lying rearwardly of the fuel tank.

Having thus described the invention, what is claimed as new and desired to be secured by Letters Patent is:

1. In a motor vehicle, a chassis frame comprising side members and cross members, said cross members being arranged in X formation, said side and cross members having horizontal flanges formed integrally therewith at their upper sides, and a metallic floor member disposed immediately above said side and cross members and rigidly secured to said flanges of said side and cross members.

2. In a motor vehicle, a chassis frame comprising side members and cross members, said members having horizontal flanges formed integrally therewith at their upper and lower sides, and a floor member secured throughout part of its length to the upper flanges of said side and cross members, and secured throughout another portion of its length to said lower flanges of said side members.

3. In a motor vehicle, a chassis frame comprising side members and cross members, said side members having integral horizontal flanges at their upper sides throughout a part only of their length and having integral horizontal flanges at their lower sides throughout the remainder of their length, and a floor member secured to said upper flanges throughout a part of its length and secured to said lower flanges throughout another portion of its length.

4. In a motor vehicle, a chassis frame comprising side members and cross members, said latter members being arranged in X form, and a unitary floor member secured to said side and cross members and extending from the forward end of said X formation to the rearward end of said side members, the forward edge of said floor member being of V-shape and being secured to the forwardly-extending members of said X formation.

5. In a motor vehicle, a chassis frame comprising side members and cross members, said latter members being arranged in X form, a unitary floor member secured to said side and cross members and extending from the forward end of said X formation to the rearward end of said side members, the forward edge of said floor member being of V-shape and being secured to the forwardly-extending members of said X formation, whereby a V-shaped opening is formed forward of said floor member, and a second floor member overlying the said V-shaped opening and comprising a toe board.

6. In a motor vehicle, a chassis having a frame comprising side members and cross members, said side members being of channel section opening inwardly and being curved upwardly adjacent their rearward ends to provide clearance for the rear axle of said chassis, the upper flange of each said side member terminating at a point in advance of said rear axle, and a floor member secured to the upper flanges of said side member, and secured to the lower flanges of said side members at points disposed rearwardly of the point of termination of said upper flanges.

7. In a motor vehicle, a chassis having a frame comprising side members and cross members, said side members being of channel section opening inwardly and being curved upwardly adjacent their rearward ends to provide clearance for the rear axle of said chassis, the upper flange of each said side member terminating at a point in advance of said rear axle, and a floor member secured to the upper flanges of said side member, and secured to the lower flanges of said side members at points disposed rearwardly of the point of termination of said upper flanges, that portion of said floor member lying rearwardly of said last named point being formed to provide a seat pan lying between said side members.

8. In a motor vehicle, a chassis having a frame comprising side members and cross members, said side members being of channel section opening inwardly and being curved upwardly adjacent their rearward ends to provide clearance for the rear axle of said chassis, the upper flange of each said side member terminating at a point in advance of said rear axle, a fuel tank disposed rearwardly of said rear axle, a floor member secured to the upper flanges of said side member, and secured to the lower flanges of said side members at points disposed rearwardly of the point of termination of said upper flanges, that portion of said floor member lying rearwardly of said last named point being formed to provide a seat pan lying between said side members and to provide clearance for said fuel tank.

JESSE G. VINCENT.